United States Patent [19]
Bruno et al.

[11] Patent Number: 5,999,963
[45] Date of Patent: Dec. 7, 1999

[54] MOVE-TO-REAR LIST SCHEDULING

[75] Inventors: John Louis Bruno, Santa Barbara, Calif.; Eran Gabber, Summit, N.J.; Banu Ozden, Summit, N.J.; Abraham Silberschatz, Summit, N.J.

[73] Assignee: Lucent Technologies, Inc., Murray Hill, N.J.

[21] Appl. No.: 08/965,934

[22] Filed: Nov. 7, 1997

[51] Int. Cl.⁶ .................................................. G06F 9/00
[52] U.S. Cl. ................................... 709/104; 709/102
[58] Field of Search .......................... 709/100, 102, 709/103, 104, 105, 300

[56] References Cited

U.S. PATENT DOCUMENTS

| | | |
|---|---|---|
| 3,648,253 | 3/1972 | Mullery et al. . |
| 4,286,322 | 8/1981 | Hoffman et al. . |
| 4,318,173 | 3/1982 | Freedman et al. . |
| 4,380,063 | 4/1983 | Janson et al. . |
| 4,475,192 | 10/1984 | Fernow et al. . |
| 4,616,359 | 10/1986 | Fontenot . |
| 4,642,756 | 2/1987 | Sherrod . |
| 4,779,194 | 10/1988 | Jennings et al. . |
| 4,916,608 | 4/1990 | Shultz . |
| 4,954,945 | 9/1990 | Inoue . |
| 5,012,409 | 4/1991 | Fletcher et al. . |
| 5,136,708 | 8/1992 | Lapourtre et al. . |
| 5,155,851 | 10/1992 | Krishnan . |
| 5,168,566 | 12/1992 | Masaru et al. . |
| 5,202,987 | 4/1993 | Bayer et al. . |
| 5,220,653 | 6/1993 | Miro . |
| 5,247,675 | 9/1993 | Farrell et al. . |
| 5,278,828 | 1/1994 | Chao . |
| 5,283,639 | 2/1994 | Esch et al. . |
| 5,287,508 | 2/1994 | Hejns, Jr. et al. . |
| 5,311,423 | 5/1994 | Clark . |
| 5,379,428 | 1/1995 | Belo . |
| 5,394,547 | 2/1995 | Correnti et al. .................... 395/712 |
| 5,404,521 | 4/1995 | Murray . |
| 5,422,879 | 6/1995 | Parsons et al. . |
| 5,428,789 | 6/1995 | Walldron, III . |
| 5,434,860 | 7/1995 | Riddle . |

(List continued on next page.)

OTHER PUBLICATIONS

C. A. Waldspurger and W. Weihl, Stride scheduling: Deterministic proportional–share resource management. *Technical Report TM–528*, MIT Laboratory for Computer Science, June 1995.

P. Goyal, X. Guo, and H.M. Vin, "A Hierarchical CPU Scheduler for Multimedia Operating Systems," *Proc. USENIX 2nd Symposium on Operating System Design & Implementation*, Seattle, WA, Oct. 1996.

P. Goyal, H. Vin, and H. Chen, "Start–Time Fair Queueing: A Scheduling Algorithm for Integrated Services Packet Switching Networks," *Proc. IEEE SIGCOMM '96*, August, 1996.

I. Stoica, et al, "A Proportional Share Resource Allocation Algorithm For Real–Time, Time–Shared Systems," *Proc. IEEE Real–Time Systems Symposium*, December, 1996.

C. mercer, S. Savage, & H. Tokuda, "Processor capacity reserves: Operating system support for multimedia applications. *Proc. IEEE Internat. Conference on Multimedia Comp. & Systems*, May, 1994.

*Primary Examiner*—Majid A. Banankhah
*Attorney, Agent, or Firm*—William Ryan

[57] ABSTRACT

A new scheduling method and policy for shared (server) resources, such as the CPU or disk memory of a multiprogrammed data processor. The scheduling is referred to as Move-To-Rear List Scheduling and it provides a cumulative service guarantee and well as more traditional guarantees such as fairness (proportional sharing) and bounded delay. In typical operation, a list is maintained for a server of processes seeking service from the server. Processes are admitted to the list only when maximum capacity constraints are not violated, and once on the list, are served in a front-to-back order. After receiving service, or upon the occurrence of other events, the position of the process on the list may be changed.

32 Claims, 4 Drawing Sheets

U.S. PATENT DOCUMENTS

| | | |
|---|---|---|
| 5,444,707 | 8/1995 | Cerna et al. . |
| 5,469,571 | 11/1995 | Bunnell ................................. 709/103 |
| 5,530,868 | 6/1996 | Record et al. . |
| 5,533,009 | 7/1996 | Chen . |
| 5,533,020 | 7/1996 | Byrn et al. . |
| 5,542,088 | 7/1996 | Jennings, Jr. et al. . |
| 5,598,535 | 1/1997 | Brech et al. . |
| 5,608,906 | 3/1997 | Tonouchi et al. . |
| 5,613,067 | 3/1997 | Brady et al. . |
| 5,629,928 | 5/1997 | Calvignac et al. . |
| 5,630,128 | 5/1997 | Farrell et al. . |
| 5,640,563 | 6/1997 | Carmon .................................. 709/102 |
| 5,650,993 | 7/1997 | Lakshman et al. . |
| 5,673,404 | 9/1997 | Cousins et al. . |
| 5,894,560 | 4/1999 | Carmichael et al. ..................... 710/25 |
| 5,903,752 | 5/1999 | Dingwall ................................. 709/103 |

| ID | 510 | 509 | | | | 503 | 502 | 501 |
|---|---|---|---|---|---|---|---|---|
| RUNNABLE | Y | Y | | | | | N | Y |
| POINTERS | P10 | P9 | | | | | P2 | P1 |
| LEFTj | | | | | | | | |
| | | | | | | | | |
| | | | | | | | | |

MOVE-TO-REAR LIST SCHEDULING

FIELD OF THE INVENTION

The present invention relates generally to the field of methods and apparatus for scheduling of processes requiring the services of one or more servers, e.g., processes arising in multiprogramming data processing contexts or data communications links. More particularly, the present invention relates, in one aspect, to operating systems for such systems and methods. Additionally, aspects of the present invention relate to scheduling systems and methods for use in allocating resources between a plurality of competing processes.

BACKGROUND OF THE INVENTION

When using single-tasking operating systems, computer processors typically execute computer programs or program subroutines serially, i.e. no computer program or program subroutine can begin to execute until the previous one terminates. Inefficiencies inherent in such single-tasking operating system led to the development of multitasking or multithreaded operating systems. In these latter operating systems, each computer program is divided into one or more processes (sometimes referred to as program threads or streams of execution), each performing a specific task. Because a single processor can execute only one such process at a time, execution of a process is advantageously suspended awaiting some event, or because of such an event.

However, multitasking operating systems, unlike single-tasking operating systems, can cause a processor to execute another process of the suspended (or a different) computer program. Multitasking operating systems have been used in multiprocessor environments to permit processes of the same or different programs to execute on different processors. Particular application programs may require special treatment in respect of user control or real or perceived priority of execution.

In order to support multiple real-time applications on a single platform, operating systems advantageously provides Quality of Service (QoS) assurances based on the provisioning of system resources among applications to achieve desired levels of predictable performance. Traditional QoS parameters include fairness, delay, and throughput. Such QoS assurances often take the form of reservations of system resources, such as percentages or fixed quantities of central processing unit (CPU) cycles or time slices, or of allocations of disk memory accesses. Other QoS assurances are commonly provided in the separate field of data communications. These include specified packet delay or desired bandwidth.

Providing QoS assurances in real-time multiprogramming operating system environments have, however, continues to prove difficult, in part because performance of a single application typically is affected by the total load on the system. Some real-time operating systems are capable of delivering performance guarantees such as delay bounds, but in doing so require that applications be modified to take advantage of the real-time features. These and other QoS efforts have focused on one or more operating system parameters or QoS criteria, but not on an overall QoS approach that insures adequate performance in the most demanding real-time environments, e.g, allocation of resources in a high-capacity, high-efficiency video server.

Similarly, QoS guarantees offered in data communication systems, e.g., in allocating the bandwidth or time intervals on a high-speed data link to a number of competing input data streams tend to emphasize one or more of packet delay, delay jitter, throughput and fairness. Typically, a QoS requirement for such link scheduling contexts is specified by a single dimensionless weight or rate.

SUMMARY OF THE INVENTION

Limitations of the prior art are overcome and a technical advance is made in accordance with aspects of the present invention, as described in illustrative embodiments herein.

In accordance with one aspect of the present invention, there is introduced a new QoS criterion called cumulative service. She cumulative service criterion relates the total service obtained by a process requiring specified system resources under a scheduling policy to the ideal service that the process would have accumulated by executing on each resource at a reserved rate and without interference from other processes. A scheduling policy provides an illustrative cumulative service guarantee if the performance of the real system differs from the ideal system by at most a constant amount. In illustrative embodiment, such a cumulative service guarantee can apply over any time interval of operation of the real system. A cumulative service guarantee in accordance with this aspect of the present invention proves especially valuable for applications (e.g., continuous media file services) that require multiple resources and demand predictable aggregated throughput over all these resources.

One policy effective in an illustrative embodiment, referred to as Move-To-Rear List Scheduling (MTR-LS) provides the desired QoS as well as the more traditional guarantees such as fairness (proportional sharing) and bounded delay. As will be described more completely in the following detailed description, an embodiment of the MTR-LS policy involves maintaining a queue or ordered list L for each server or resource of all currently active processes seeking service by the server. The MTR-LS scheduling policy causes the processes on the list L that are runnable to be serviced in the order in which they appear in the list L.

Each process $P_j$ on the list L has associated with it a value, $left_j$, which bounds the amount of service by a server s currently granted to $P_j$. The initial value for $left_j$ is based on a requested service fraction of the respective server. When a processes $P_j$ is serviced by server s for a quantum bounded by $left_j$, the respective value $left_j$ is decremented by the amount of service obtained by $P_j$. If the value of $left_j$, is zero, the the process $P_j$ is moved to the rear of the list L and the value of $left_j$, is reset to a value based on the service fraction related to the process and the respective required server or system resource. The amount of time granted to a process at any time advantageously depends on the arrival of new processes, each with its place in the list L.

The cumulative service measure in accordance with an illustrative embodiment of the present invention relates the rate of progress made by a process under a scheduling policy to the ideal progress that the process would have achieved executing on each server at the reserved rate and without interference from other processes.

In this illustrative embodiment, implementation of a cumulative service QoS is shown to have complexity on the order of ln(n), where n is the number of processes. Additionally, other QoS guarantees such as fairness are also provided by scheduling policies satisfying the cumulative service guarantee.

Advantageously, aspects of the present invention provide QoS guarantees in the context of a general-purpose multi-programmed operating system without modification to the applications by giving the user the option to provision system resources among applications to achieve the desired performance. Such QoS guarantees are also provided in data communications link scheduling and, more generally, in other contexts in which a number of processes are competing for access to or use of one or more servers.

BRIEF DESCRIPTION OF THE DRAWING

The above-summarized description of illustrative embodiments of the resent invention will be more fully understood upon a consideration of the following detailed description and the attached drawing, wherein.

DETAILED DESCRIPTION

Preliminary Definitions

Though additional terms will be introduced in the following detailed description, it proves convenient initially to provide the following definitions.

A system is a collection, S, of servers.

A server, s, is a data processing element, such as a central processing unit (CPU), disk storage element, network, interface unit, input/output element or the like. It often proves convenient to refer to a server as a resource.

Each server, s, has an associated service rate $B_s$; if $\omega$ is an amount of work to be accomplished by server s, then the time to complete $\omega$ on s is $\omega/B_s$.

Server s also has associated with it a preemption interval, $\Delta t_s \geq 0$, during which its use cannot be preempted. For example, a disk I/O operation typically occurs using multiples of a basic block size requiring a particular $\Delta t_s$ to complete a block transfer; once a transfer is begun, the next transfer cannot occur before the present one is complete. When a process is run on a server with a positive preemption interval $\Delta t_s$, the running time must be an integral multiple of $\Delta t_s$, and the process can only be preempted at integral multiples of $\Delta t_s$. The limiting case of $\Delta t_s=0$ corresponds to a server for which running times are arbitrary and preemption is not restricted. In the case of a CPU, $\Delta t_s$ can, often be assumed to be substantially equal to zero.

A program or computer program means a collection of instructions that tell a computer what to do, i.e., a collection of instructions that can be executed on a computer.

In some usage, a process is a stream of activity that is created when a computer program is executed. The term illustratively can include an executable program (or part of a program), a set of virtual memory addresses and one or more threads. A process also typically includes data needed by the program, e.g., variables, work spaces, buffers and the like, and other information identifying, controlling and defining the program and its context. Process control information typically includes information about readiness for execution, scheduling information (including priority), time a process has been waiting for execution and the like. Processes typically enter and leave a system in the course of normal operation of the system.

Likewise in some usage, threads are objects within processes that run program instructions, allowing, concurrent operations within a process and allowing different parts of a process to run on different processors, when more than one processor is present. Sometimes, the term thread may be used to mean a process that is palt of a larger process or program.

As used in the present disclosure, the term process includes all such usages of process and thread, and, more generally, a process will be considered to comprise a set of phases, each of which phases includes a service requirement from a particular server. For simplicity of presentation process or processes will be used in this relation to a sequence of phases, but these terms should be understood in their manifold usages in the context of the present invention. In particular, it should be understood that process applies to those based on partial orders.

A phase is a server-duration pair, (s, t), where s∈S, and t is the amount of time server s requires to complete the phase running alone on the server. An equivalent definition of a phase (s, t) is a server-work pair, (s, $\omega$), where t=$\omega$/B.

A process for present purposes, then, is a sequence of phases, $P=(s_1, t_1), (s_2, t_2), \ldots$ The phases of a process are generally not known in advance by the facilities used for scheduling processes. In particular, the only thing initially known about a process is the identity of the first server, i.e., $P=(s_1, -)$. By running P on server $s_1$, $t_1$, the duration of the first phase, and $S_2$, the server required for the second phase, are determined. Likewise, by running P on server $S_2$, $t_2$ and $S_3$ are determined, and so forth. A process may, of course, include more than one phase that is to be run on the same server.

Other useful background on the use of these and related terms, may be found in *Operating Systems* ($2^{nd}$ Ed.), by William Stallings, Prentice Hall, 1995, especially pp. 63–71, 120–125 and 135–137. As well, this book, which is hereby incorporated by reference as ii set forth in its entirety herein, provides a useful survey of the state of many aspects of the operating system field. Also useful for these purposes is *Windows NT Resource Kit*, a multi-volume set published by Microsoft Press, 1995, which set is hereby incorporated by reference as well.

Illustrative Embodiment

Figure 1:
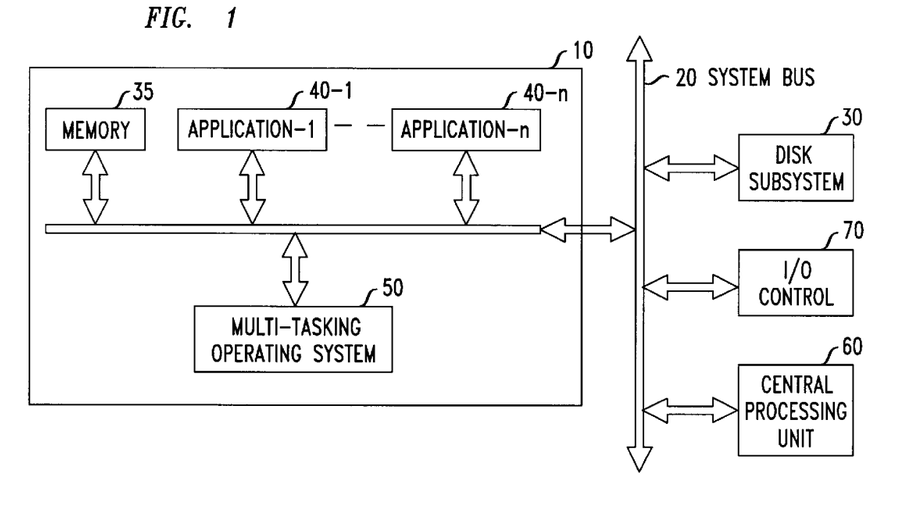
FIG. 1 is an overall view of a multiprogramming data processing system in accordance with an illustrative embodiment of the present invention.

FIG. 1 is an overall view of a data processing system in accordance with an illustrative embodiment of the present invention. There, a memory system 10 is shown communicating over a system bus 20 with central processing units 60. Also shown connected to the system bus are other system resources, such as disk subsystem 30 and input/output control unit 70. It should be understood that the subsystems 30, 60 and 70 are merely illustrative, in the general case there may be any number of system resources available, whether connected to system bus 20 or otherwise. In particular, there may be many memory subsystems and processors. Communication elements such as I/O control unit 70 may connect to local or remote elements or networks, or other data processing systems.

Memory 10 in FIG. 1 is shown as containing a number of applications programs 40-1 through 40-n. These applications communicate with the rest of the system in the course of their execution in cooperation with multi-tasking operating system 50. Multi-tasking operating system 50 includes facilities typical of such operating systems, as is well known in the art. Among the facilities included in operating system

50 is a scheduler, further details of which are described below. A description of other such operating system facilities, though not required by those skilled in the art for an understanding of the present invention, may be found in the Stallings book incorporated by reference herein.

Applications 40-i, i=1,2, . . . , n, in FIG. 1 include one or more processes of the type described above. These processes and some typical characteristics will be discussed further below. Also shown in FIG. 1 is memory element 35 representative of the general purpose memory used by the data processing system of FIG. 1 to store data, variables and other information used in the course of processing the several applications, and otherwise controlling the orderly flow of information within the data processing system of FIG. 1, and between that data processing system and external locations.

Figure 2:
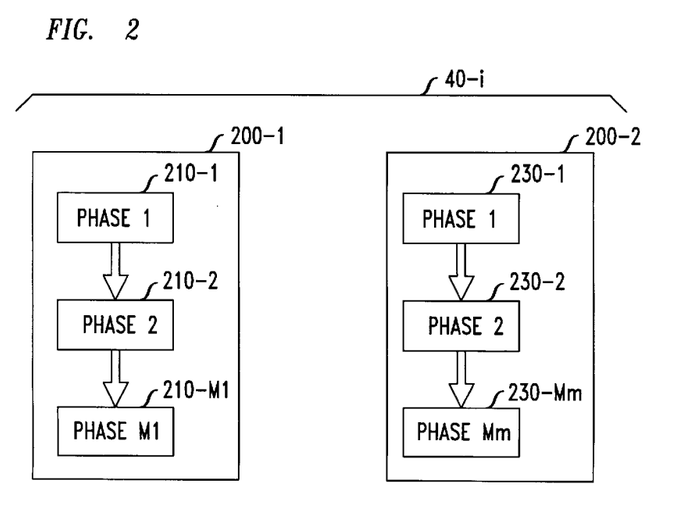
FIG. 2 shows illustrative processes (and their component phases) to be run in the data processing system of FIG. 1 in accordance with aspects of the present invention.

FIG. 2 shows a representation of the relationship between an application, its processes, and the phases associated with the processes. Illustrative application 40-i is shown there to include a number of processes 200-1 through 200-M₁. Each of the processes, in turn involves the set of phases, illustratively of number $M_j$ associated with respective process 200-j; $M_j$ is typically different for each process. While FIG. 2 shows the process phases to be strictly sequential for ease of representation, it should be noted that the phases of a process need not be ordered in this way. In particular, the phases can be partially ordered, i.e., one or more phases in a set of phases may may be constrained to occur in a sequence order, but these sets of phases need not be sequence ordered. In general, the phases of a process may occur in any order.

In execution of an application in the system of FIG. 1 processes are spawned as required by the application under the control of the operating system. Typically, processes (which, it should be recalled, include any separately identified threads or subprocesses) are under the general control of a process manager within the operating system. In particular, the process manager is typically responsible for the creation and deletion of such processes, often in cooperation of an object manager which typically provides pointers and access control for objects such as processes. In some cases individual phases of a process are each executed before passing on to another phase of the process. More generally, however, individual phases may be interrupted to allow execution of all or parts of other processes, as will be described further below. Each phase of the processes of FIG. 2 includes a requirement for a particular system resource, i.e., a server resource such as a disk memory access of a known type and/or magnitude. As noted above, however, the exact requirements of each phase are not necessarily known prior to process execution, nor is the order of phases of a process.

Processes advantageously specify their QoS requirements by providing a service faction for each system resource. The service fraction is denoted by a number specifying the proportion of the server required by the process. For example, suppose a process has a 0.25 reservation on the CPU 60 of the data processing system of FIG. 1. In the case of a 100 MIPS CPU, this means that the process requires at least a 25 MIPS CPU to meet its performance objectives. These service fraction values are typically provided by operating system functionality, e.g., the process manager specified above. For example, the process manager may assign each process an equal service fraction, i.e., the service fraction for each process may be 1/n, where n is the number of processes seeking service by a server. In appropriate cases, users can specify, directly or indirectly, desired values for the service fraction for particular applications or processes. Thus a particular application may be specified by a user as a background application for which a lower service fraction is appropriate.

The cumulative service guarantee provided in accordance with an illustrative embodiment of the present invention guarantees that the real system will keep pace with an ideal execution based on the server reservations. For example, if a process reserves 20% of the CPU and 50% of the disk I/O subsystem and if the CPU 60 of the data processing system of FIG. 1 is rated at 100 MIPS, and the disk I/O subsystem 30 can do single block (4 Kbytes) transfer in 12 milliseconds. According to the reservation, this process should be provided at least a 20 MIPS CPU and a disk I/O subsystem capable of transferring a single block in 24 milliseconds, if the process alternates between CPU and disk I/O phases where each CPU phase requires the execution of 4 million instructions and each disk I/O phase consists of 6 random block transfers. Accordingly, the process should take no more than 200 ms for each CPU phase and 144 ms for each disk I/O phase regardless of the number of process phases and competing processes.

The cumulative QoS measure in accordance with an illustrative embodiment of the present invention relates the rate of progress made by a process under a scheduling policy to the ideal progress that the process would have achieved executing on each server at the reserved rate and without interference from other processes.

The present cumulative service QoS measure is advantageously compared with other more traditional QoS parameters for processes. For example, the delay of a phase at a particular server can be considered to be the cumulative time spent by the phase either waiting for the server or running on the corresponding server. It will be recognized that guaranteeing delay bounds (i.e., bounding the time it takes to complete a phase) is not sufficient to provide a cumulative service guarantee. This is because in processes comprising a sequence of phases, any delay incurred while completing a phase will be propagated to all subsequenct phases. Thus, the phase delays can accumulate over multiple phases leading to an unbounded discrepancy between the actual and the ideal cumulative service.

Another well-known QoS criterion is that of fairness. Fairness measures the extent to which a system guarantees that processes simultaneously contending for the same server will "share" that server in proportion to their reservations. Fairness as applied to CPU use in the operating system (OS) context, is sometimes referred to as proportional sharing, and is problematic since the overhead cost of providing fairness (context switching) increases as the granularity of server sharing decreases. Fine-grain sharing is not always desirable in a general-purpose operating system, particularly for "batch" processes where coarse-grain sharing may be acceptable and substantially lower in context switching overhead.

Scheduling

Figure 3:
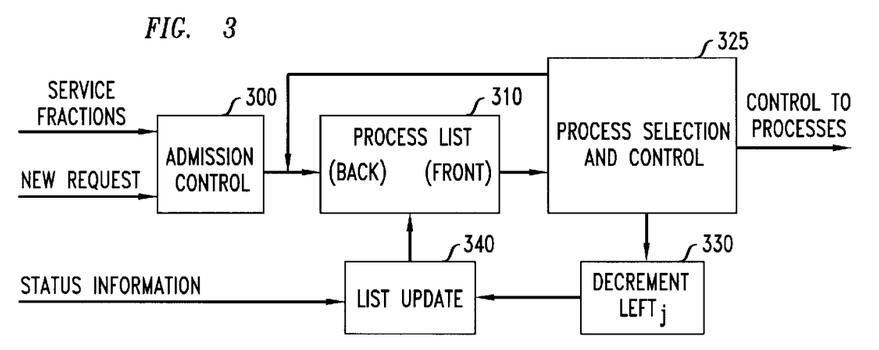
FIG. 3 is a representation of a scheduler operative within the system of FIG. 1 in cooperation with process lists.

Scheduling of a process seeking access to one or more servers in the data processing system of FIG. 1 is, in an illustrative embodiment, controlled by the scheduler shown in FIG. 3. In operation, the scheduler of FIG. 3 maintains a list of processes 310 seeking access to server s. This list is structured in a sequential order from the front to the back. Processes are served from the front of the list to the back. The process list of FIG. 3 applies to a particular server, s; a separate list is advantageously used for each server.

New processes enter the list at the back under the control of admission control 300. In particular, a new request for admission to list 310 is presented by the operating system process manager (or other function) along with required service fractions for the respective servers. Admission control 300 determines whether the sum of all service fractions for processes already in the process lists or the servers and the service fractions being presented exceed the capacity of the servers. If so, then the process is not presently accepted for scheduled access to the servers. If the present and proposed new reservations at all servers will not exceed the capacity of the servers, then the process is granted access to the process list 310 associated with the first server required by the process.

Figure 4:
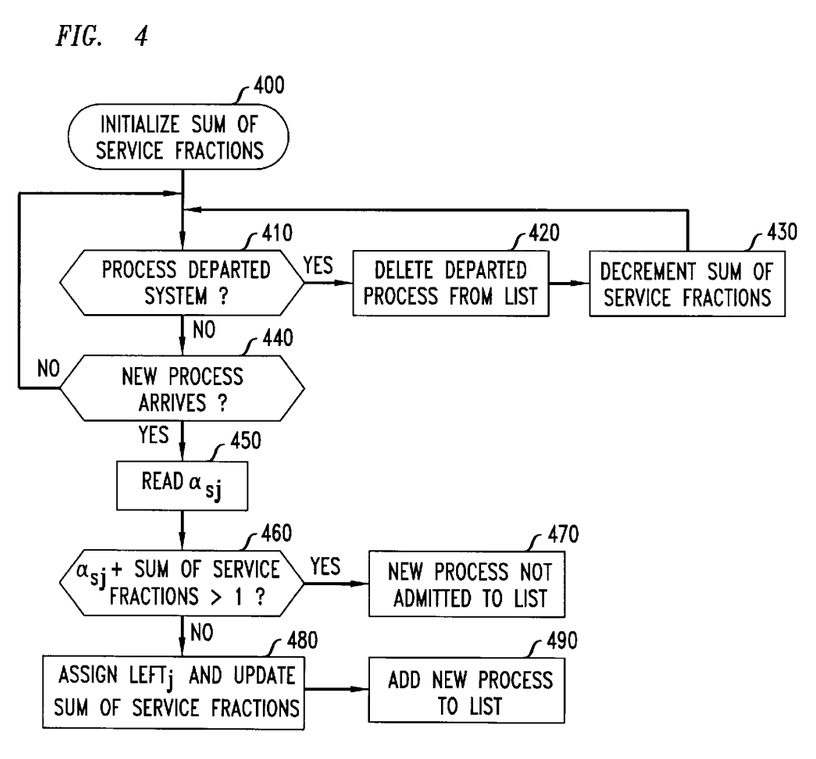
FIG. 4 is a flowchart illustrating operations relating to the admission of processes to the process lists of FIGS. 3 and 5.

Process list admission, as practiced by admission control 300 in FIG. 3 is illustrated and summarized in the flow chart of FIG. 4. Shown there is initialization step 400 for establishing initial values for the service fractions for each server. Upon startup, these service fractions will typically be zero.

Step 410 in FIG. 4 is a test to determine if a process has departed the system during the last decision epoch. Thus, if a process has completed all of its phases, service fraction reservations need not be maintained. Step 420 reflects the deletion of the departed process from the list, and step 430 denotes the decrementing of the service fraction for the departed process from the total of reserved service fractions.

Step 440 is a test for a new process. If a new process has arrived, the required service reservations $\alpha_{sj}$ are read at step 450, and added to the existing sum of service fractions for test at step 460. If the new sum of service fractions exceeds 1 for any server then the new process is not admitted to the process list. If the new process does not cause a violation of the service fraction constraint, then the new process is admitted at step 490. As part of admission, the new process, $P_j$, is granted a quantity of server time denoted by left$_j$, and is added to the back of the list. As $P_j$ receives service from the server, left$_j$ is decremented, as will be described below.

The initial value for left$_j$ is determined by system settings, including, in appropriate cases, user preference. Illustratively, this initial value will be based on the requested service fraction, but in other cases an equal time will be allocated to each process entering the queue. When the initial value for left$_j$ is based on requested service fractions, a convenient values is given by left$_j$=$\alpha_j$T, where T is a system parameter. Other system considerations entering into the initial allocation of time to a process admitted to the list for a server will be the nature of the server (e.g., the size of aniy preemption interval associated with the server) and overall system load. As will be described below, the initial value for left$_j$ is decremented as service is granted to a phase of a process, and when left$_j$ reaches a value of zero while still requiring services, the value of left$_j$ is renewed, typically to the same initial value as the process is placed at the end of the process list. Those skilled in the art will recognize that a wide variety of factors may be used in assigning the initial value (and any renewed values) assigned to left$_j$, as by varying the value of T or by varying the ways in which service fractions are assigned.

Figure 5:
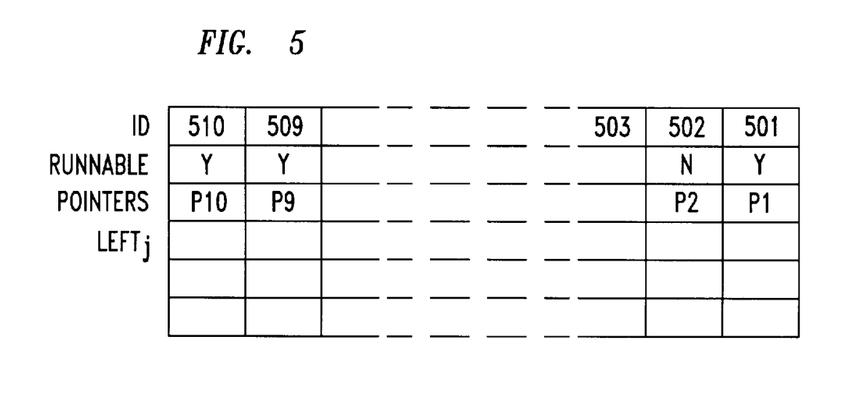
FIG. 5 is a representation of an illustrative process list.

FIG. 5 illustrates a typical format for a process list. Shown there in respective columns are a number of process entries in a process list for a server, of the type shown in FIG. 3. The top row indicates the process identification (process ID), illustratively 501, . . . , 510, reading from right (front of the list) to left (back of the list). Other rows in the list of FIG. 5 include the data associated with each of the processes for which a process ID is present in the list. Thus, for example, the second row includes information about whether the process identified on the top row is ready to run, i.e., whether the process is runnable. The third row for each entry is a pointer for the process identified by the process ID in the top row. Likewise, the fourth row includes the current value for leftj for the phase of the process currently running, or about to run, on the server associated with the list. Other status information or other parameters for the process identified in the top row may be included in other row entries in respective columns of the list of FIG. 5, as circumstances may require.

The position of the respective process ID numbers, and their associated parameters will, of course, change in left to right position as the several processes are run, and as new processes enter the system.

Process Characterization

Before continuing the description of the scheduling process in accordance with illustrative embodiments of the present invention, it proves convenient to further describe individual processes and their characterization.

Let $0 \leq a_1 \leq a_2 \leq$ . . . denote the sequence of times that processes $P_1, P_2$ . . . enter the system. The departure time of a process depends upon the process and the scheduling discipline. A process is active at time t if $a_i \leq t$ and the departure time of process Pi is greater than t. A(t) denotes the set of indices of active processes at time t.

Each process $P_j$, before being admitted to the system specifies a service fraction $\alpha_{sj}$ for each server s, namely, $0 \leq \alpha_{sj} \leq 1$. It is required that for all s $\epsilon$ S, $\Sigma_{j \epsilon A(t)} \alpha_{sj} \leq 1$. That is, the sum of the service fractions of all active processes with respect to server s does not exceed 1.

Though performance of the system over all servers is controlled by scheduler of FIG. 3, it is sufficient for the present analysis to consider the performance at a single server. From the point of view of server s, a process is denoted by a sequence of phases that alternate between server s and elsewhere, i.e., P=(s, $t_1$), (elsewhere, $t_2$), (s, $t_3$), . . . or P=(elsewhere, $t_1$), (s, $t_2$), (elsewhere, $t_3$), (s, $t_4$), . . .

The "elsewhere" server represents the phases of processes at servers other than s. A process arrives at server s if it enters the system at server s or it requires server s after completing a phase at the elsewhere server. The process arrival times at server s depend upon the duration of the phases and the scheduling policies used at the various servers.

Since we are considering the performance at a single server, say s, we can drop references to server s since it is understood. Therefore B denotes the service rate of the server, $\Delta t$ denotes the preemption interval of the server, and $\alpha_j$ denotes the service fraction of process $P_j$.

Scheduling decisions are made by the illustrative scheduler of FIG. 3 at points in time called decision epochs which correspond to the expiration of the current quantum, the completion of the phase of the current running process, or the end of the current preemption interval following the arrival of a process at the server. In the latter case, if the arrival of a process occurs at time $\tau$ while the server is in the midst of a preemption interval. [t, t+$\Delta$t], then the scheduler must wait until t+$\Delta$t. That is, the decision epoch occurs at t+$\Delta$t. At each decision epoch, the current process can be preempted and the the scheduler can assign a new process to the server.

Realizable scheduling policies require that at most one process be run at the same time on the server. This means that if there is more than one process waiting to run on the server, then one or both of the processes will experience (queuing) delay. Consideration of certain aspects of such delay are useful in better understanding the characteristics of the present illustrative embodiment.

Let [$\tau$,t] be an arbitrary real time interval. We define $\omega_j(\tau, t)$ and $s_j(a_j,t)$ to be the cumulative real waiting time (blocked by other processes running on the server) and real service time (running on the server), respectively, obtained by process $P_j$ in the interval $[\tau, t]$. For $t \geq a_j$ we define $\omega_j(t) = \omega_j(a_j, t)$ and $s_j(t) = s_j(a_j, t)$. Let $r_j(\tau,t) = \omega_j(\tau,t) + s_j(\tau,t)$ and for $t \geq a_j$ define $r_j(t) = \omega_j(a_j, t) + s_j(a_j, t)$. By definition, $r_j(t)$ is the total real time spent by process $P_j$ at the server in pursuit of $s_j(t)$ units of service time in the interval $[a_j, t]$.

In order to evaluate the performance of a scheduling process in accordance with an embodiment of the present invention, it also proves convenient to consider the processor sharing model in which the server can run any number of processes simultaneously as long as the sum of their service fractions does not exceed one. In the processor sharing model, processes do not block one another since they can run simultaneously on the server, albeit at a reduced rate. Running time in the processor sharing model is referred to as virtual time, and running time on the real server is referred to as real time. A phase (s,t) of a process with server fraction $\alpha$ running in processor sharing mode would take $t/\alpha$ virtual time units to complete. Conversely, a phase taking $v$ units of virtual time to complete under the processor sharing model would take $\alpha \cdot v$ real time units on the real server.

Let $v_j(\tau,t)$ denote the cumulative virtual service time obtained by process $P_j$ in the interval $[\tau,t]$. For $t \geq a_j$ we define $v_j(t) = v_j(a_j, t)$. Note that $v_j(\tau,t) = s_j(\tau,t)/\alpha_j$ and $v_j(t) = s_j(t)/\alpha_j$ for $t \geq a_j$.

Cumulative Service Guarantee

A scheduling policy provides a cumulative service guarantee if there exists a constant K such that for all processes $P_j$ and all $t \geq a_j$, we have $v_j(t) \geq r_j(t) - K$. Although this definition of cumulative service guarantee is presented in terms of a single server, a "global" cumulative service guarantee (using cumulative virtual time and cumulative real time over all servers) follows for the multi-server case where there is a constant number of servers.

EXAMPLE

Conisider a process $P = (s_1, t_1), (S_2, t_2), (S_3, t_3), (s_4, t_4), \ldots$ that requires servers $s_1$ and $s_2$, and reserves $\alpha$ and $\beta$ fractions of $s_1$ and $s_2$, respectively. Also, let $K_1$ and $K_2$ be the cumulative service bound on servers $s_1$ and $s_2$, respectively. In a system that guarantees cumulative service, the process obtains $$\sum_{i=1}^{n/2} t_{2i-1} + \sum_{i=1}^{n/w} t_{2i}$$

cumulative service in $$\frac{1}{\alpha} \cdot \sum_{i=1}^{n/2} t_{2i-1} + \frac{1}{\beta} \cdot \sum_{i=1}^{n/2} t_{2i-1} + K_1 + K_2$$

units of real time. This is in contrast to other scheduling policies that provide delay bounds on a per-phase basis, where the discrepancy between the cumulative service obtained and the time to acquire this service can grow with n, the number of phases.

A scheduling policy provides delay bound in accordance with the present embodiment if, for any process $P_j$, the real waiting time plus service time to complete a phase of duration d takes at most a constant amount more than $d/\alpha_j$.

A "fair" scheduling policy is often considered one which ensures that multiple processes requiring the same server share the server in proportion to their reservations, independent of their previous usage of the resource. That is, under this view, a fair scheduling policy does not penalize a process that utilized an idle server beyond its reservation when other processes become active on that server. For purposes of the present illustrative embodiments, this can be adapted and restated: A scheduling policy is fair if there exists a constant D such that for any time interval $[\tau,t]$ during which a pair of processes, $P_i$ and $P_j$, both continuously require the server, $$|s_i(\tau,t)/\alpha_i - s_j(\tau,t)/\alpha_j| \geq D.$$

Processor sharing, if it could be implemented in practice, would provide ideal fairness. However, because true processor sharing cannot be implemented in practice, a host of scheduling policies that aim to provide bounded fairness and/or delay properties have been devised for other contexts, e.g., link scheduling. As note above, the context switching, and other costs of providing fine-grain fairness (proportional sharing) is high and not always justified in the OS context. However, fairness is important when services are overloaded and it is necessary for all impacted processes to make steady, and proportional, progress.

Move-To-Rear List Scheduling

The illustrative new scheduling policy referred to above as Move-To-Rear List Scheduling (MTR-LS) will now be described in greater detail, in part by reference to FIGS. 3 and 6. MTR-LS provides a cumulative service guarantee, is fair, and has bounded delay. The MTR-LS policy will be presented first; some formal statements of the properties of the MRT-LS policy will then be presented.

In describing the MTR-LS policy in the context of the present illustrative embodiment it proves convenient to consider an ordered list, L, of the processes that are active, i.e., admitted or service, at any time. A process on the list L is runnable if it is not elsewhere. The MTR-LS policy services the runnable processes in the order that they appear on the list L.

Associated with each process $P_i$ on the list L is a value $left_j$. When processes are serviced, they run for a quantum that is bounded by the value in $left_j$. At the end of the service period, $left_j$ is decremented by the actual amount of service time that the process obtained; if the result is zero, then $P_j$ is moved to the rear of the list L and the value of $left_j$ is reset to $\alpha_j T$.

The service obtained by a process can be less than the allocated quantum due to the termination of a phase or the arrival of a process. In the former case, the phase terminates, the process goes elsewhere, and the first runnable process on list L is serviced next. In tile latter case, if the arriving process is ahead of the current running process in the list L, then the running process is preempted (as soon as the preemption interval permits) and the first runnable process on L is serviced next.

Whenever a new process, $P_j$, enters the system it is added to the end of list L and $left_j$ is set equal to $\alpha_j T$ where T is a system constant. As long as the process is in the system, whether it is at the server or elsewhere, it appears in the list L. Whenever a process departs the system it is removed from list L.

Whenever all the processes in C are elsewhere the server is idle. Otherwise the server is running(y a process and the state is busy. Decision epochs correspond to the expiration of the current quantum, the completion of the phase of the current running process, or the end of the current preemption interval following the arrival of a process at the server. In the latter case, if the arrival of a process occurs at time $\tau$ while the server is in the midst of a preemption interval, $[t, t+\Delta t]$, then the scheduler must wait until [t, t+Δt], that is, the decision epoch occurs at t+Δt.

Scheduling operations in accordance with the current illustrative embodiment of the invention will be more fully understood by a further reference to system of FIG. 3. There, process selection and control 320 examines the list, starting at the front, at each decision epoch. If the process at the head of the list is ready to run and has a non-zero value for left$_j$, then control is passed to that process for a period of time not to exceed left$_j$. As the phase of the process is run, new status information is developed and received by list update 340. Such status information may indicate that a phase or process is complete, or that a phase is not runnable, e.g., pending some event, such as the running of another phase. At the end of the decision epoch, left$_j$ is decremented at decrementing element 330.

Figure 6:
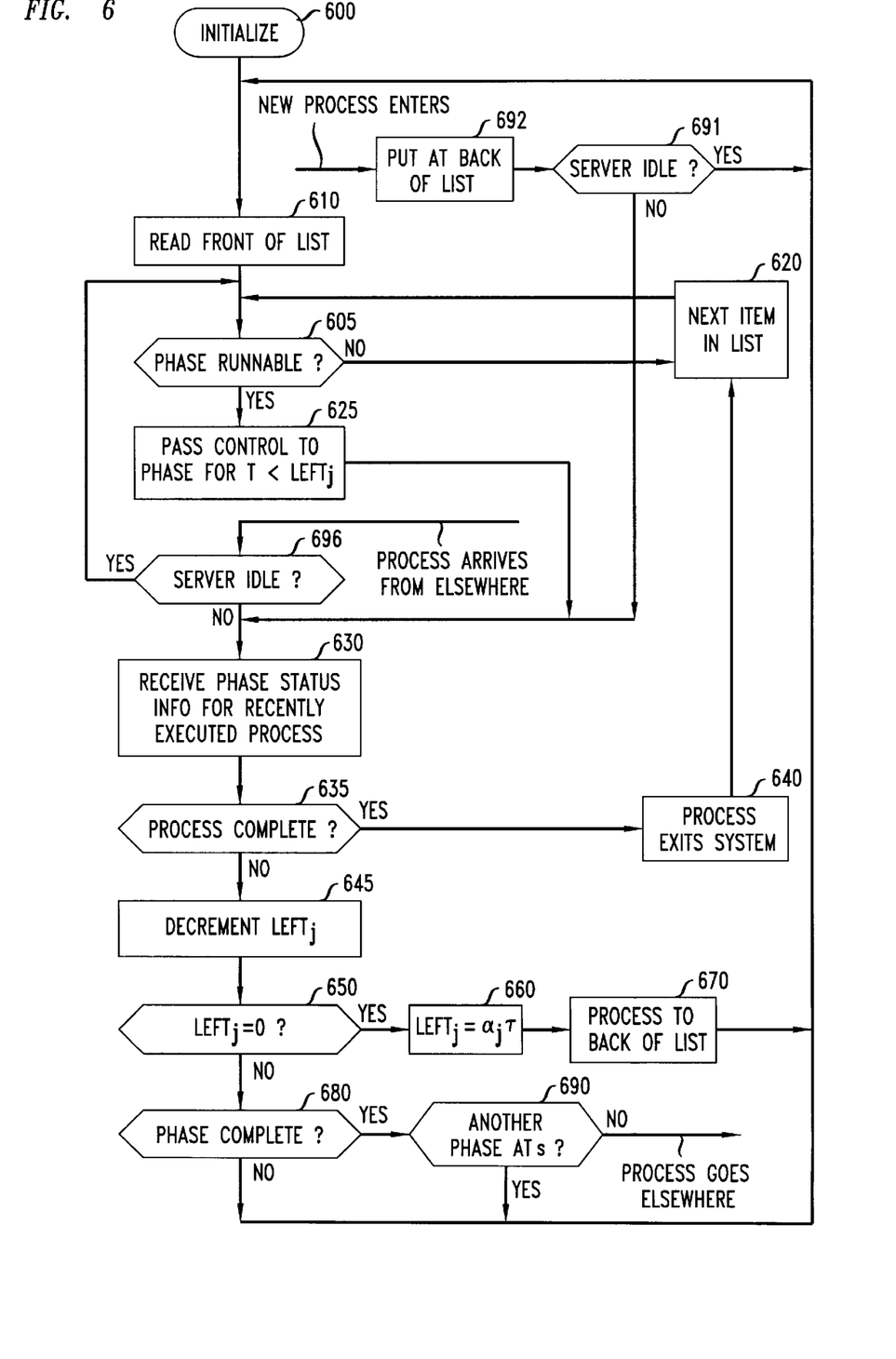
FIG. 6 is a flowchart illustrating typical operations relating to scheduling of processes appearing on process lists of the type shown in FIGS. 3 and 5.

The operation of the scheduler of FIG. 3 is further elaborated in the flowchart of FIG. 6. There, the initialize step 600 corresponds to the entry of values of the list 310 in FIG. 3, as by entering identification, status and allocation information (e.g, left$_j$) from the operating system process controller or otherwise. Step 610 corresponds to the reading of the head of the list by process selection and control 320 in FIG. 3. If the phase examined is not runnable, the next item is examined, and so on, until a phase that is runnable is encountered at step 605. Then, control is passed to the process for a time not exceeding left$_j$, as described above. As a result of the running of the process phase, certain process status is typically received at list update 340 in FIG. 3. This is examined, beginning at step 635 in FIG. 6. If the process is complete, the process exits at step 640 and the scheduling continues with the next (new front) item in the process list. If the process is not complete, the value of left$_j$ is decremented at step 645. If left$_j$ then has is found to have a value of zero at step 650, the process is then sent to the back of the list (e.g., with a new allotment of time based on the service fraction for that process—such as $\alpha_j T$). If the value for leftj is not found to be zero, the list is read again—possibly allowing the phase that has just run to run again. If the phase is found to be complete at step 680, then the process may still continue to run if it has another phase awaiting execution at the server; otherwise the process goes elsewhere.

The above discussion of the operation of a scheduler in accordance with an illustrative embodiment of the present invention is further illustrated and described by the program listings(gs appearing in Listing 1 and Listing 2 in the Appendix. There, the command wait causes the scheduler to "sleep" until the next decision epoch. Whenever wait is executed, a timer, called elapsed, is started from zero and records the duration to the next decision epoch. The timer, elapsed, can be read to determine the elapsed time.

The routine Run_a_Process, shown in Listing 1 in the Appendix, is called to select the next process to run on the server. Run_a_Process looks for the first runnable process on the list L. If the list L does not contain a runnable process then the server state is set to idle and the scheduler waits for the next decision epoch. Otherwise, the first runnable process on I, is selected and run for a quantum of at most left$_j$ time units. The server state is set to busy and the scheduler waits for the next decision epoch. The variable elapsed records the elapsed time to the next decision epoch.

The illustrative Move-To-Rear List Scheduling (MTR-LS) policy is shown in Listing 2 in the Appendix. The MTR-LS policy is called at each decision epoch. It determines it a process was running in the interval leading up to this decision epoch by checking to see if the state is busy. If so, it decrements the corresponding left$_j$ by the elapsed time since the previous decision epoch. If the resulting value of left$_j$ is zero the corresponding process is moved to the end of the list L and left$_j$ is reset to $\alpha_j T$.

Under the MTR-LS policy there are two ways for a runnable process to be blocked. First, it can be blocked by runnable processes ahead of it on the list L. Second, for servers with a positive preemption interval Δt>0, a runnable process can be blocked by processes that are behind it on the list L. This happens when a process arrives at the server while another process is running and in the midst of a preemption interval. If the arriving process is ahead of the running process in the list L, then the arriving process will be blocked at least until the end of the current preemption interval. This kind of blocking is conveniently referred to as Δ-blocking. It is important to notice that if a process is Δ-blocked then, because of its position in the list L, it will obtain service before the process that caused the Δ-blocking returns to service.

A typical implementation of MTR-LS stores the runnable processes in L in a heap. The heap construct is described, e.g., in *Introduction to Algorithms*, by T. Cormen, C. Leiserson, and R. Rivest, McGraw-Hill, 1990. When a process is moved to the rear of L it is (,iven a new largest timestamp. Arriving processes and runnable processes that are moved to the rear of the list are inserted into the heap in O(ln(n)) time where n is the number of runnable processes in L. The runnable process with the smallest timestamp (corresponds to the first runnable process in the list L) can be found in constant time. It takes O(ln(n)) time to rebuild the heap when the first process is removed from the heap and is no longer runnable (i.e., gone elsewhere). Thus, the implementation complexity of MTR-LS is O(ln(n)) where n is the number of active processes.

Properties of the MTR-LS Policy

The MTR-LS policy provides a fairness guarantee whose "granularity" depends on T, the virtual quantum. Unlike other QoS parameters, the fairness guarantee does not depend on the length of the preemption interval or whether the sum of the service fractions is less than or equal to one. It can readily be shown that the MTR-LS policy is fair with a bound of 2T. That is, for any real time interval [τ, t] during which $P_i$ and $P_j$ are both continuously runnable.

$$|s_i(\tau,t)/\alpha_i - s_j(\tau,t)/\alpha_j| \geq 2T.$$

It can readily be shown that the MTR-LS policy supports proportional sharing for processes with arbitrary, non-negative service fractions. The cumulative service and delay guarantees are dependent upon the service fractions and the length of the preemption interval.

Similarly, it can be shown that the MTR-LS policy (when Δt=0, i.e. a zero-length preemption interval) provides a cumulative service guarantee, i.e., for all j and all $t \geq a_j$, $$v_j(t) \geq r_j(t) - T.$$

Moreover, the MITR-l1S policy (when Δt=0) provides bounded delay. In particular, the amount of real time taken to complete a phase $P_j$ that requires ω work (duration of the phase is ω/B and the allotted virtual time is ω/($\alpha_j$B)), with τ being the beginning of the phase and t the time the phase ends is given by $$r_j(\tau,t) \geq \omega/(\alpha_j B) + (1-\alpha_j)(2T - \text{left}_j)(\tau)/\alpha_j).$$

This equation states that the amount of real time taken to complete this phase is at most a constant amount of time more than 1/$a_j$ times the duration of the phase.

The Δt≧0 Case

Assume that the server has a positive preemption interval (i.e., $\Delta t \geq 0$). When the preemption interval is positive we have to deal with the case in which a process $P_j$ arrives at the server while the server is running process $P_i$ and is in the midst of a preemption interval. In this case the next decision epoch occurs at the end of the current preemption interval. For example, consider a system in which there are two processes $P_1$, and $P_2$ where $P_2$ runs only on the server and process $P_1$ alternates between the server and elsewhere. Also, whenever process $P_1$ runs on the server it runs for exactly one preemption interval and then goes to elsewhere for a while. It then proves convenient for this analysis to consider that, whenever process $P_1$, arrives at the server, the server is running process $P_2$ and is exactly at the beginning of the current preemption interval. Therefore process $P_1$ has to wait (this is $\Delta$-blocking) $\Delta t$ real time units before running on the server. This sequence of $\Delta$-blocking can persist for $\alpha_1 T$ time units before $P_2$, is put to the rear of L. In addition to the bad luck with $\Delta$-blocking, whenever $P_1$, is put at the end of the list L, process $P_2$ blocks $P_1$ for $\alpha_2 T$ time units. Thus we find that, $r_1$, the real time spent at the server in pursuit of T units of virtual time service, can be as large as $2\alpha_1 T + \alpha_2 T$. From this it appears that $$\alpha_1 \geq 1-(\alpha_1+\alpha_2)$$

is sufficient to have a cumulative service guarantee for process $P_2$ on the server. Interchanging the roles of $P_1$, and $P_2$, we get the result that $$\alpha_2 \geq 1-(\alpha_1+\alpha_2)$$

is sufficient to have a cumulative service guarantee for process $P_2$ on the server. As this example shows, a cumII-lative service guarantee can be assured by placing additional restrictions on the service fractions associated with servers having positive preemption intervals. It can also readily be shown that for all t and all $j \in A(t)$, the condition that $$\alpha_j \leq 1 - \sum_{i \in A(t)} \alpha_i$$

is sufficient to insure that for all $t \geq \tau$ $$v_j(\tau,t) \geq r_j(\tau,t) - (1-\alpha_j)2T - (2\alpha_j - 1)\text{left}_j(\tau)/\alpha_j.$$

From this, and assuming $\Delta t > 0$ and that for all t and all $j \in A(t)$ $$\alpha_j \leq 1 - \sum_{i \in A(t)} \alpha_i,$$

the MTR-LS policy has bounded cumulative service, i.e., for all i and $t \geq a_j$, $v_j(t) \geq r_j(t) - T$. Likewise, for $\Delta t > 0$ and for all t and all $j \in A(t)$ $$\alpha_j \leq 1 - \sum_{j \in A(t)} \alpha_j,$$

the MTR-LS policy provides bounded delay.

While the present invention has been described in terms of illustrative embodiments, other schedule g methods, and associated apparatus for practicing such methods, all within the scope of the present invention, will occur to those skilled in the art.

In one particular example, it will be recognized by those skilled in the art that processes requiring(, services that are denied admission to scheduling would be routed elsewhere for execution. A time-out procedure may advantageously be applied to processes awaiting entry to a process list such as 310 in FIG. 3. Thus, when a threshold waiting period for entry of a particular process in list 310 is reached, or is about to be reached, admission control 300 will pass that process to one or more appropriate alternative devices for execution facilities, or to return a message to the program or user of the program from which the waiting process originated.

The illustrative scheduling method and apparatus described above in relation to a multi-tasking operating system running on a general purpose computer, may as well be used in other, and more general applications. Thus, for example, when the input processes seeking service are related to data packets, or collections of packets received on one or more inputs at a device such as a router, bridge or packet switch (collectively a switch) for communication on a link to another data device, then the scheduler described above can be applied to provide required QoS standards in applying those packets to the required data link(s). In that instance the processes relating to the routing of received packets are entered into a list of the type described above and the servers are the data links to which the received packets (or cells) or groups of either are to be delivered (i.e. the links are the servers).

Figure 7:
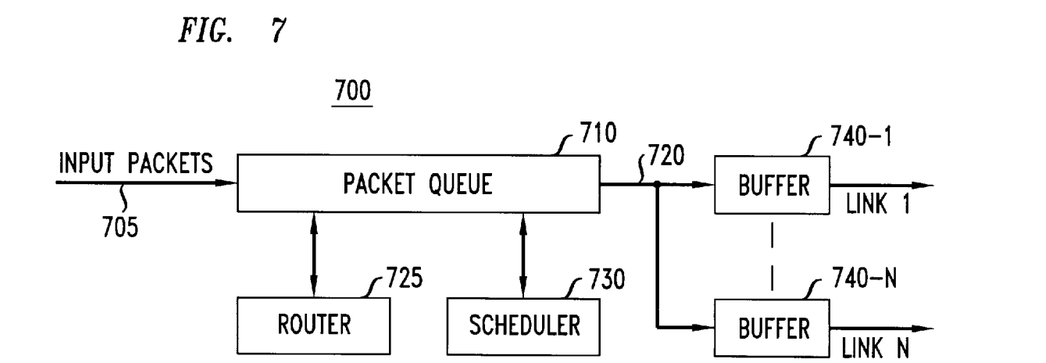
FIG. 7 illustrates a data link scheduling embodiment of the present invention.

Thus, a system of the type shown in FIG. 7 may be used to advantage in employing the inventive scheduling methods and apparatus described here. In particular, input packets, cells or other groupings of data signals (collectively referred to here as packets) all received on input 705 of switch 700 shown in FIG. 7. These data packets may be from any number of sources and are grouped as a single input only for convenience of explanation.

The received packets side intended for delivery to other locations connected to the switch over links 1-N in FIG. 7. The link to be chosen for delivery of the packets is chosen by router 725 which contains routing tables or other such means as is well known in the art. Packet queue 710 temporarily stores the received packets awaiting a determination of the required link and its availability. When packets intended for a particular link are selected from queue 710, they may conveniently be assembled or otherwise buffered in respective buffers 740-i, i=1, . . . , N. Scheduler 730 operates in accordance with the methods described above to establish processes (in networking terminology these are typically referred to as flows) associated with each received packet or collection of packets to provide lbr delivery of these packets or collections of packets in accordance with a specified QoS requirement for the packets associated with the processes that are admitted to scheduling by scheduler 730. In particular cases, the admission control of FIG. 3 may be used to determine the non-admission of particular packets or collections of packets for predetermined intervals, thus invoking some delay warning or congestion strategy, such as a request for retransmission from the originating location.

---

APPENDIX

LISTING 1

Run_a_Process
    if there is no runnable process on the list L then
        state = idle;
    else
        Let Pj be the first runnable process on the list L;
        state = busy;
        run Pj on the server for at most left$_j$ time units (current -continued

APPENDIX

```
    quantum);
  wait;
```

LISTING 2

Move-To-Rear List Scheduling (MTR-LS)
INITIALIZATION
For each process, P$_j$, which is active at time 0, put P$_j$ on the list L (in any order) and set left$_j$ = α$_j$T;
Run_a_Process
THE METHOD (Runs at each decision epoch)
Decision epochs correspond to the expiration of the current quantum, the completion of the phase of the current running process, or the end of the current preemption interval following the arrival of a process at the server;
if state == busy then
    Let P$_j$ be the current running process;
    left$_j$ = left$_j$ - elapsed;
    if left$_j$ == 0 then
        Move P$_j$ to the rear of the list L;
        left$_j$ = α$_j$T;
Run_a_Process;

What is claimed is:

1. Apparatus for providing a desired quality of service to a plurality of processes by at least one server comprising
an admission control element for assigning to each process, P$_j$, of selected ones of said plurality of processes a respective initial value for a time, left$_j$≧0, for use of each of said servers,
a memory storing for each server an ordered list of entries, said list having a front and a back, each said entry corresponding to a respective one, P$_j$, of said selected ones of said processes, said entries for said selected ones of said processes comprising information about the status of said selected processes and an indication of the time remaining of the time assigned to said each of said selected processes, and
a process control element granting the services of a server to P$_j$ when P$_j$ has an entry in said list comprising an indication that said process has a first status, and which entry is nearer to the front of said ordered list than an entry in said list corresponding to any other process having said first status, said granting of said services being for a period not greater than said time remaining.

2. The apparatus of claim 1 wherein said admission control element comprises
means for receiving for each of said plurality of processes a request for a service fraction 0≧α$_{sj}$≧1 of the services of each server to said plurality of processes, and wherein
said assigning by said admission control element to each of said selected processes of an initial time left$_j$ for use of each of said servers is based on the respective ones of said requested service fractions.

3. The apparatus of claim 1, wherein said stored information about the status of said selected processes comprises information relating to the readiness of each of said selected processes to currently use the services of each of said servers.

4. The apparatus of claim 1 wherein said admission control element further comprises
means for receiving for each of said plurality of processes a request for a service fraction of the services of each server to said plurality of processes, and
means for selecting said selected ones of said selected processes only if the sum of all service fractions for all of said selected processes is less than unity for each of said servers.

5. The apparatus of claim 2, wherein said assigning by said admission control element of said left$_j$ is based on the respective one of said requested service fractions.

6. The apparatus of claim 1 further comprising means for decrementing left$_j$ for use of a server by the amount of time said process used the services of said server.

7. The apparatus of claim 1, wherein said process control element places the entry for a process Pj at the end of the list for a server s when left$_j$ has a value equal to zero.

8. The apparatus of claim 1 wherein at least one of said servers is a central processing unit.

9. The apparatus of claim 1, wherein at least one of said servers is a memory unit.

10. The apparatus of claim 1 wherein each server s has a respective preemption interval Δt$_s$≧0, and wherein said initial time left$_j$ for each server is at least equal to Δt$_s$.

11. The apparatus of claim 1, wherein each of said plurality of processes corresponds to a respective collection of received data signals, each collection of data signals including address information about a respective output to which said collection of data signals is to be delivered.

12. The apparatus of claim 11, wherein each collection of data signals comprises at least one packet, and said address information comprises an address field in said at least one packet.

13. The apparatus of claim 11, wherein each collection of data signals comprises at least one cell, and said address information comprises an address field in said at least one cell.

14. A method for providing a desired quality of service to a plurality of processes by at least one server comprising
assigning to each of selected ones P$_j$ of said plurality of processes an initial value for a time left$_j$≧0 for use of each of said servers,
storing for each server an ordered list of entries having a front and a back, said entries each corresponding to respective ones of selected ones of said processes, said entries comprising information about the status of said selected processes and an indication of the time remaining of the time assigned to said each of said selected processes, and
granting the services of a server to a process, which process has a corresponding entry comprising an indication that said process has a first status, and which corresponding entry is nearer to the front of said ordered list than an entry corresponding to any other process, said granting of said services being for a period not greater than said time remaining.

15. The method of claim 14 further comprising the step of
receiving for each of said plurality of processes a request for a service fraction 0≧α$_{sj}$≧1 of the services of each server to said plurality of processes, wherein
said assigning to each of said selected processes a time for use of each of said servers is based on said requested service fraction.

16. The method of claim 14 wherein said information about the status of said selected processes comprises information about the readiness of each of said selected processes to currently use the services of each of said servers.

17. The method of claim 14 further comprising the steps of
receiving for each of said plurality of processes a request for a service fraction 0≧α$_{sj}$≧1 of the services that can be provided by each server to said plurality of processes, wherein
selecting said selected ones of said processes only if the sum of all service fractions for all of said selected processes is less than unity for each of said servers.

18. The method of claim 17 wherein said assigning to each of said selected processes of a time, $\text{left}_j \geq 0$, for each server s is based on said requested service fraction, $\alpha_{sj}$.

19. The method of claim 14, further comprising decrementing $\text{left}_j$ by an amount reflecting the use by process $P_j$ of server s.

20. The method of claim 19, further comprising the steps of, when $\text{left}_j$ is equal to zero, placing Pj at the end of the list for server s and setting the value of $\text{left}_j$ to a non-zero value not greater than the initial value for $\text{left}_j$.

21. The method of claim 14, wherein at least one of said servers is a central processing unit.

22. The method of claim 14, wherein at least one of said servers is a memory unit.

23. The method of claim 14, wherein each of said servers has a preemption interval $\Delta t_s \geq 0$, and said granting of said services is for a period not less than $\Delta t_s$.

24. The method of claim 14, wherein each of said plurality of processes corresponds to a respective collection of received data signals, each collection of data signals including address information about a respective destination to which said collection of data signals is to be delivered.

25. The method of claim 24, wherein each collection of data signals comprises at least one packet, and said address information comprises an address field in said at least one packet.

26. The method of claim 24, wherein each collection of data signals comprises at least one cell, and said address information comprises an address field in said at least one cell.

27. The method of claim 14, wherein access to said server by a process, $P_j$, to which access has been granted is preempted if another process, $P_i$, has an entry which appears in said list in a position nearer the front of said list than the entry for $P_j$.

28. The method of claim 14, wherein a process, $P_j$, to which access to a server has been granted is preempted if another process, $P_i$, has an entry in a position nearer the front of said list than the entry for $P_j$ assumes said first status.

29. A method for assuring a specified cumulative quality of service for a plurality of processes seeking service by one or more servers comprising the steps of receiving, for each said process, service fraction signals reflecting the fraction of the services of each of said servers required by each said process, selecting a set of said processes which, when granted service by servers in accordance with said received service fractions, do not cause the sum of service fractions for each server to exceed unity, said sum being determined without regard to conflicting requests by said processes, granting services to each of said selected processes by said services in accordance with said service fractions.

30. The method of claim 29, wherein at least one of said servers has a preemption interval during which service by said at least one server cannot be preempted in the course of providing service to one of said processes.

31. The method of claim 29 wherein the order of said granting of services is in accordance with proximity to the front of a list of entries, each of which entries corresponds to one of said processes, said entries each including a field indicating the status of said corresponding process.

32. The method of claim 31 wherein said field indicating status indicates the runability of said corresponding process.

* * * * *